(12) United States Patent
Matsuzaki et al.

(10) Patent No.: US 8,431,195 B2
(45) Date of Patent: Apr. 30, 2013

(54) INK COMPOSITION FOR PRINTING, PAPER CONTAINER MATERIAL USING THE INK COMPOSITION, AND HEAT INSULATING FOAMED PAPER CONTAINER

(75) Inventors: Manabu Matsuzaki, Ritto (JP); Hiroshi Tsukawaki, Tokyo (JP); Mitsuaki Hirata, Tokyo (JP); Shinya Sugiura, Tokyo (JP); Hiroyuki Kawashima, Tokyo (JP)

(73) Assignees: Nissin Foods Holdings Co., Ltd., Osaka-shi (JP); Toyo Ink Mfg. Co., Ltd., Tokyo (JP)

( * ) Notice: Subject to any disclaimer, the term of this patent is extended or adjusted under 35 U.S.C. 154(b) by 0 days.

(21) Appl. No.: 12/935,115

(22) PCT Filed: Mar. 27, 2009

(86) PCT No.: PCT/JP2009/056276
§ 371 (c)(1),
(2), (4) Date: Dec. 16, 2010

(87) PCT Pub. No.: WO2009/119800
PCT Pub. Date: Oct. 1, 2009

(65) Prior Publication Data
US 2011/0101083 A1    May 5, 2011

(30) Foreign Application Priority Data

Mar. 28, 2008 (JP) ................ 2008-088013

(51) Int. Cl.
*B32B 1/02* (2006.01)
*B32B 1/08* (2006.01)
*B32B 23/06* (2006.01)
*B32B 27/10* (2006.01)
*B32B 27/40* (2006.01)
*C09D 11/00* (2006.01)
*C08K 3/34* (2006.01)
*C08L 75/00* (2006.01)
*C08G 18/28* (2006.01)

(52) U.S. Cl.
USPC ....... 428/34.2; 428/34.4; 428/34.6; 428/34.7; 428/35.7; 428/36.4; 428/36.5; 428/423.1; 428/532; 428/537.5; 106/31.13; 106/31.6; 106/31.65; 106/31.75; 106/31.9; 106/31.95; 106/31.97; 523/160; 524/492; 524/493; 524/507; 524/590; 524/591

(58) Field of Classification Search ................. 428/34.1, 428/34.2, 34.3, 34.4, 34.6, 34.7, 35.2, 35.4, 428/35.7, 36.4, 36.5, 36.6, 36.7, 36.91, 423.1, 428/532, 575.5; 523/160; 524/590, 591, 524/507, 492, 493; 106/31.13, 31.6, 31.65, 106/31.75, 31.9, 31.95, 31.97
See application file for complete search history.

(56) References Cited

U.S. PATENT DOCUMENTS

| | | | |
|---|---|---|---|
| 4,435,344 A | 3/1984 | Iioka | |
| 4,944,802 A * | 7/1990 | Chagnon et al. | 524/113 |
| 5,766,709 A | 6/1998 | Geddes et al. | |
| 5,840,139 A | 11/1998 | Geddes et al. | |
| 6,030,476 A | 2/2000 | Geddes et al. | |
| 6,319,590 B1 | 11/2001 | Geddes et al. | |
| 6,749,913 B2 | 6/2004 | Watanabe et al. | |
| 2002/0030296 A1 | 3/2002 | Geddes et al. | |
| 2003/0017284 A1 | 1/2003 | Watanabe et al. | |
| 2003/0104195 A1 | 6/2003 | Geddes et al. | |

FOREIGN PATENT DOCUMENTS

| | | |
|---|---|---|
| EP | 2 261 292 | 12/2010 |
| JP | 57 110439 | 7/1982 |
| JP | 11 189279 | 7/1999 |
| JP | 11 217419 | 8/1999 |
| JP | 3014629 | 12/1999 |
| JP | 2001 270571 | 10/2001 |
| JP | 3414978 | 4/2003 |
| JP | 2004 323731 | 11/2004 |
| JP | 2004 346197 | 12/2004 |
| JP | 2006 168080 | 6/2006 |
| JP | 2006 168770 | 6/2006 |

OTHER PUBLICATIONS

Machine translation of JP 2006-168770, Jun. 2006.*
Machine translation of JP 11-217419, Aug. 1999.*

International Search Report issued Jun. 23, 2009 in PCT/JP09/56276 filed Mar. 27, 2009.
U.S. Appl. No. 12/935,713, filed Sep. 30, 2010, Matsuzaki, et al.
International Preliminary Report on Patentability and Written Opinion issued on Nov. 9, 2010 in PCT/JP2009/056276 filed Mar. 27, 2009.
Office Action issued Dec. 28, 2012, in Chinese patent application No. 200980111163.4 (w/English translation).

* cited by examiner

*Primary Examiner* — Walter B Aughenbaugh
(74) *Attorney, Agent, or Firm* — Oblon, Spivak, McClelland, Maier & Neustadt, L.L.P.

(57) ABSTRACT

An ink composition having a colorant; a binder resin; and a solvent; wherein the elongation ratio of the binder resin is 400% to 3,000%; wherein the binder resin comprises a urethane resin and a vinyl chloride/vinyl acetate copolymer, and the mixing ratio of the urethane resin:vinyl chloride/vinyl acetate copolymer relative to the total weight of the urethane resin and the vinyl chloride/vinyl acetate copolymer is 50:50 to 99:1; and wherein the urethane resin comprises a urethane-urea resin that is obtained by a process comprising reacting dibutylamine and a urethane prepolymer obtained by a process comprising reacting a polymeric polyol component having a number average molecular weight of 500 to 10,000 and an organic diisocyanate component having terminal isocyanate groups. A heat insulating foamed paper container material having at least one print pattern formed from said ink composition.

9 Claims, 2 Drawing Sheets

INK COMPOSITION FOR PRINTING, PAPER CONTAINER MATERIAL USING THE INK COMPOSITION, AND HEAT INSULATING FOAMED PAPER CONTAINER

This application is a national stage entry of PCT/JP2009/056276 filed Mar. 27, 2009, and claims priority to JP 2008-088013, filed Mar. 28, 2008.

TECHNICAL FIELD

The present invention relates to an ink composition for printing, a paper container material using the ink composition, and a heat insulating foamed paper container. More particularly, the present invention relates to an ink composition for forming a printed layer which has an excellent foaming adaptability, has less surface unevenness, and provides a smooth surface with suppressed occurrence of cracks in the ink film, on the film of a paper container material having a thermoplastic synthetic resin film that is foamed by a heat treatment carried out upon the production of a heat insulating foamed paper container and thereby forms a heat insulating layer; a paper container material using the ink composition, and a heat insulating foamed paper container. The heat insulating foamed paper container having a printed layer that is formed from the ink composition of the present invention exhibits excellent heat insulating properties, and can therefore be suitably used as a container for holding food containing a high-temperature liquid or low-temperature liquid. For example, the heat insulating foamed paper container according to the present invention can be suitably used as a container such as a cup or a bowl for foods including soup, sweet red bean soup, miso soup and noodles.

BACKGROUND ART

In recent years, the demands for ink and the printing industry are extending into a broad range of applications, concomitantly with the varietization of packaging containers. For example, in the field of containers such as the cups used for those food products generally called as "cup noodles," including ramen products, udon and soba noodles, which become edible several minutes after an appropriate amount of boiling water is poured into the container, polystyrene cups have been mainly used from the viewpoint of cost and heat insulating properties.

However, in the case of foamed polystyrene cups, printing on the cups must be performed individually after forming of the cup. Accordingly, the printing method is limited to methods of using a curved surface printing machine or a stamp printing machine, and there has been a problem that the printing speed and the print quality are poor. Furthermore, owing to the reasons such as that the polystyrene price is increasing concomitantly with a recent increase in the price of petroleum and that under the implementation of the Containers and Packaging Recycling Law, the food product manufacturers are responsible for the recycling fee, transfer from polystyrene cups to paper cups is being promoted in recent years.

As one of the representative structures of paper containers, there is known a double cup having a heat insulating air layer which is formed by bonding paper and paper with furrows therebetween. However, the double cup has problems of high weight and high price. Therefore, heat insulating, foamed paper containers are attracting more attention these years.

A heat insulating foamed paper container is generally produced using a paper container material having a thermoplastic synthetic resin film that is foamed by a heat treatment carried out upon production of the container and forms a heat insulating layer. More specifically, the paper container material has a structure in which, for example, a high-melting point polyethylene film having a melting point of about 130° C. to 135° C. is laminated on one surface of a base paper (inner side of container), and a low-melting point polyethylene film having a melting point of about 105° C. to 110° C. (hereinafter, referred to as "low-Mp film") is laminated on the other surface of the base paper (outer side of container), and formed on the surface of the low-Mp film is a printed layer containing print patterns such as decorative patterns, the company name and a barcode.

In the production process for the heat insulating foamed paper container, a paper container material having a printed layer formed in advance is punched out into a predetermined shape, this is used as a body member of cup to form a cup, and then the cup is subjected to a heat treatment near the melting point of the low-Mp film, thereby foaming the low-Mp film. Foaming occurs when the moisture contained in the base paper evaporates at the time of the heat treatment and is pushed out to the side of the low-Mp film which has been softened, and thereby the low-Mp film swells toward the outer side. The low-Mp film thus foamed functions as a heat insulating layer and imparts heat insulating properties to the paper container. Such a heat insulating foamed paper container is disclosed in, for example, Japanese Patent Application Laid-Open (JP-A) No. 57-110439 (Patent Document 1).

The formation of a printed layer on the surface of the low-Mp film of the material for heat insulating foamed paper containers is usually carried out according to a surface printing method based on gravure printing. In the field of surface printing based on gravure printing, ink is applied on the surface of objects to be printed, such as various base papers and plastic packaging containers. Therefore, inks for gravure printing are requested to have printing suitability for objects to be printed, as well as adhesiveness to the base papers and plastic materials, and various resistances such as the resistance to blocking to prevent adhesion between printed matters after printing, and the abrasion resistance and heat resistance required upon the formation of container.

Furthermore, an ink for gravure printing usually contains an aromatic solvent such as toluene as a main solvent, so as to achieve a balance between the solubility of binder resins and the dryability. However, recently, the tendency toward using a printing ink that does not contain an aromatic solvent is growing stronger, in order to improve the environment of the printing work site.

Moreover, when the product value as a heat insulating foamed paper container is considered, the ink for gravure printing for forming a printed layer of the container is desirably such that the ink film does not impede but promotes foaming of the low-Mp film that constitutes the heat insulating layer and can thereby provide a container surface having less surface unevenness, and that the ink film has less occurrence of cracks and can provide a smooth printed surface.

As the ink for gravure printing for forming printed layers of heat insulating foamed paper containers, there has been conventionally known an ink containing a polyamide resin and a cellulose derivative as binder components. However, in the case of an ink containing a polyamide resin as a main component of the binder components, when the ink film is exposed to heat or light over a long time, the low molecular weight components such as oils and fats contained in the polyamide resin undergo oxidative degradation into acetaldehydes, thereby causing a problem of generating a fat-based odor. Furthermore, since there is a possibility that the content in the container may cause a change in taste due to the generated fat-based odor, this poses a serious problem. In addition, the printing ink mentioned above markedly suppresses the foaming of the low-Mp film, and thus there occur differences in the thickness of the low-Mp film after foaming, between a printed area and an unprinted area of the printed layer, or between a printed area and an overprinted area where further printing has been applied on an existing printed area. Therefore, the printed areas or overprinted areas on the container surface become concave areas, and obvious level differences occur. Thus, a smooth sense of touch is not obtained, and there are problems such as impaired merchantability or unreadable barcodes.

For the purpose of improving the surface unevenness of the printed layer in conventional heat insulating foamed paper containers, JP-A No. 11-189279 (Patent Document 2) proposes a technology of using, on the surface of a low-Mp film, an ink that can be synchronized with the foaming of the low-Mp film without inhibiting the foaming. Furthermore, JP-A No. 2001-270571 (see Patent Document 3) discloses a specific composition of the synchronous ink. The component blend of the white ink disclosed in Patent Document 3 includes 30 to 35% of an inorganic pigment, 15 to 25% of a urethane-based resin, 0 to 5% of a vinyl chloride acetate resin, 15 to 20% of a ketone-based solvent, 5 to 10% of an acetic acid ester-based solvent, 0 to 10% of an alcohol-based solvent, 0 to 10% of a toluol-based solvent, and 1 to 5% of a polyethylene wax and other auxiliary agents. The component blend of a color ink includes 5 to 10% of an organic pigment, 5 to 10% of a urethane-based resin, 0 to 5% of a vinyl chloride acetate-based resin, 40 to 50% of a ketone-based solvent, 15 to 25% of an acetic acid ester-based solvent, 5 to 10% of an alcohol-based solvent, 0 to 10% of a toluol-based solvent, and 1 to 5% of a polyethylene wax and other auxiliary agents. The synchronous ink is disclosed as an ink suitable for forming an undercoat layer.

Patent Document 1: JP-A No. S57-110439
Patent Document 2: JP-A No. H11-189279
Patent Document 3: JP-A No. 2001-270571

DISCLOSURE OF THE INVENTION

According to the techniques of using the synchronous inks disclosed in the Patent Documents 2 and 3, since the ink film of the printed layer can be synchronous with the foaming of the low-Mp film that forms the heat insulating layer of a container without impeding the foaming, there is a possibility of reducing the surface unevenness of the container. However, when a print pattern is overprinted on an undercoat layer, there still is a tendency that concavity and convexity are formed at the surface. In particular, the color ink has a larger suppressive power against the foaming of the low-Mp film as compared with the white ink. Accordingly, for example, when the white ink is applied as an undercoat layer and the color ink is overprinted thereon, the thickness of the low-Mp film after foaming is not made uniform, and there still is a tendency that concavity and convexity are likely to be formed at the surface. Thus, new improvements are desired.

Therefore, the present invention is purported to address the items listed below, in order to solve the problems posed heretofore in the field of printing inks intended for heat insulating foamed paper containers.

An object of the present invention is to provide an ink composition intended for a printing ink for forming a printed layer of a heat insulating foamed paper container, which ink composition exhibits excellent foaming adaptability for the foaming of the low-Mp film as a result of a heat treatment upon the production of a container, and has less occurrence of cracks in the ink film. The term "excellent foaming adaptability" as used herein means that the smooth ink film of the printed layer formed on the surface of a low-Mp film which is foamed by a heat treatment, does not significantly impede the foaming of the film, and indicates following performance to the foaming, whereby the heat insulating layer which is formed by uniform expansion of the film, is maintained in a state of having concavity and convexity at the surface to a minimum.

Another object of the present invention is to provide an ink composition which has heat resistance and light fastness in addition to the properties described above, forms an ink film that does not generate foul odor even when exposed to heat or light over a long time, and is excellent in abrasion resistance, anti-blocking property and adhesiveness to a low-Mp film that serves as a base material.

Another object of the present invention is to provide an ink composition which does not use an aromatic solvent and is excellent in the various properties described above.

Another object of the present invention is to provide a white ink composition and a color ink composition, which are excellent in the various properties described above.

Another object of the present invention is to provide a heat insulating foamed paper container material having a printed layer which is formed from the ink composition excellent in various properties, on a low-Mp film that is foamed by a heat treatment and forms a heat insulating layer.

Another object of the present invention is to provide a heat insulating foamed paper container having less concavity and convexity at the container surface and having a smooth printed layer surface, that is, having a smooth surface and excellent external appearance, using the paper container material mentioned above having a printed layer formed from the ink composition excellent in various properties.

The inventors of the present invention conducted a thorough investigation on ink compositions in order to solve the problems of the past in the printed layer of heat insulating foamed paper containers. As a result, the inventors found that when a binder resin exhibiting a particular elongation ratio is used, the formation of surface unevenness of the foamed surface that is formed after a low-Mp film is foamed by a heat treatment, that is, the difference in level between the printed layer surface and the foamed surface, is markedly improved. The inventors also found that when such an ink composition is prepared to have a particular constitution, the heat resistance, light fastness, abrasion resistance, anti-blocking property, and adhesiveness to the low-Mp film that serves as a base material can be increased, in addition to the decrease in the surface unevenness. The inventors also found that such an ink composition can be provided without using an aromatic organic solvent. The inventors also found that when one or more chromatic pigments selected from organic pigments, Bengara, Prussian Blue, Ultramarine Blue, carbon black and graphite are used, the formation of surface unevenness is even more effectively improved by adding silicon dioxide. The present invention is based on the findings such as described above, and relates to the items described below.

A first aspect of the present invention relates to an ink composition for forming a printed layer to a heat insulating foamed paper container material which has a base paper; a first thermoplastic synthetic resin film that covers one surface of the base paper; and a second thermoplastic synthetic resin film that covers the other surface of the base material, has a lower melting point than the first thermoplastic synthetic resin film, and is foamed by a heat treatment to form a heat insulating layer, wherein the printed layer of the ink composition is formed on the surface of the second thermoplastic synthetic resin film, and the ink composition contains a colorant, a binder resin and a solvent, and the elongation ratio of the binder resin is 400% to 3,000%.

Here, the binder resin preferably contains at least a urethane resin. Furthermore, the urethane resin preferably contains a first urethane resin that is obtained by a reaction between a polymeric polyol component having a number average molecular weight of 500 to 10,000 and an organic diisocyanate component. The urethane resin preferably contains a urethane-urea resin obtained by a reaction between an amine compound or an amide compound and a urethane prepolymer having terminal isocyanate groups, which is obtained by a reaction between a polymeric polyol component having a number average molecular weight of 500 to 10,000 and an organic diisocyanate component.

The binder resin preferably contains the urethane resin, and nitrocellulose or a vinyl chloride/vinyl acetate copolymer. Here, when the binder resin contains the urethane resin and a vinyl chloride/vinyl acetate copolymer, it is preferable that the mixing ratio of the urethane resin:vinyl chloride/vinyl acetate copolymer relative to the total weight of the urethane resin and the vinyl chloride/vinyl acetate copolymer is 50:50 to 99:1.

In the case of constituting the ink composition as a color ink, the colorant is preferably one or more chromatic pigments selected from organic pigments, Bengara, Prussian Blue, Ultramarine Blue, carbon black and graphite. In the case of preparing the ink composition of a color ink, it is preferable to add silicon dioxide as an additional component. The particle size of the silicon dioxide used is preferably 2 to 20 µm. Furthermore, the content of silicon dioxide in the color ink is preferably adjusted to 0.2 to 5% by weight relative to the total weight of the ink. On the other hand, in the case of constituting the ink composition as a white ink, a white pigment is used as the colorant. The white pigment is preferably titanium dioxide.

A second aspect of the present invention relates to a paper container material for heat insulating foamed paper containers, including a base paper; a first thermoplastic synthetic resin film that covers one surface of the base paper; a second thermoplastic synthetic resin film that covers the other surface of the base paper, has a lower melting point than the first thermoplastic synthetic resin film, and is foamed by a heat treatment to form a heat insulating layer; and a printed layer provided on at least a part of the surface of the second thermoplastic synthetic resin film, wherein the printed layer contains at least one print pattern formed from the ink composition of the present invention.

It is preferable that the printed layer have an undercoat layer covering the entire surface of the second thermoplastic synthetic resin film, and a print pattern provided on at least a part of the surface of the undercoat layer, and that the undercoat layer is formed from the ink composition of the present invention prepared as a white ink, while the print pattern is formed from the ink composition of the present invention prepared as a color ink.

It is preferable that the printed layer have an undercoat layer covering the entire surface of the second thermoplastic synthetic resin film, and a print pattern including a first print section provided on the surface of the undercoat layer and a second print portion provided in the non-printed areas other than the first print section, and that the undercoat layer and the first print section is formed from the ink composition of the present invention constituted as a white ink, while the second print section is formed from the ink composition of the present invention constituted as a color ink.

A third aspect of the present invention relates to a heat insulating foamed paper container obtained by joining a container body member formed from the paper container material of the present invention, with a bottom plate member such that the first thermoplastic synthetic resin film of the paper container material forms the inner wall surface and the second thermoplastic synthetic resin film forms the outer wall surface, thereby forming a container, and foaming the second thermoplastic synthetic resin film by heat treating the container.

The present application claims priority based on Japanese Patent Application No. 2008-088013 filed by the same Applicant on Mar. 28, 2008, the subject matter of which has been incorporated into the present application by reference.

According to the present invention, there can be provided an ink composition which improves the problems of the past in the printed layer of heat insulating foamed paper containers, realizes a heat insulating foamed paper container having a smooth surface and excellent external appearance, and is excellent in various resistances required of an ink and in the printing quality. Furthermore, when such an ink composition is used, there can be provided a heat insulating foamed paper container having less surface unevenness and a smooth printed surface, that is, having a smooth surface, even when the printed layer is constituted to have a color ink overprinted on a white ink.

EXPLANATIONS OF REFERENCE NUMERALS

Figure 1:
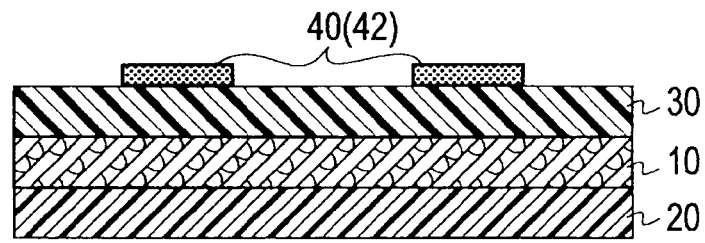
FIG. 1 is a schematic cross-sectional view showing an embodiment of a paper container material according to the present invention.

10 Base paper
20 First thermoplastic synthetic resin film (high-Mp resin film)
30 Second thermoplastic synthetic resin film (low-Mp resin film)
30' Heat insulating layer (second thermoplastic synthetic resin film after foaming)
40 Printed layer
42 Print pattern
42a First print section
42b Second print section
44 Undercoat layer
50 Container body
50a Inner wall surface of container
50b Outer wall surface of container
60 Bottom plate of container

BEST MODE FOR CARRYING OUT THE INVENTION

Hereinafter, the present invention will be explained in detail.

(Ink Composition)

The ink composition according to the present invention is an ink composition for forming a printed layer on the surface of the second thermoplastic synthetic resin film carried by a material for heat insulating foamed paper containers, which has a base paper; a first thermoplastic synthetic resin film that covers one surface of the base paper; and a second thermoplastic synthetic resin film that the other surface of the base paper, has a lower melting point than the first thermoplastic synthetic resin film, and is foamed by a heat treatment to form a heat insulating layer, and the ink composition is characterized in that the composition contains containing a colorant, a binder resin and a solvent, and the elongation ratio of the binder resin is 400% to 3,000%. In the following descriptions, the first thermoplastic synthetic resin film will be simply referred to as "high-Mp resin film" and the second thermoplastic synthetic resin film as "low-Mp resin film".

One of the characteristics of the ink composition of the present invention lies in the binder resin having a specific elongation ratio. Therefore, the binder resin used in the present invention will be explained first.

The ink composition of the present invention uses a binder resin having an elongation ratio in the range of 400% to 3,000%. When such a binder resin is used, the foamed surface obtained after foaming the low-Mp resin film by a heat treatment, has barely any occurrence of surface unevenness, and a smooth surface is obtained. If the elongation ratio of the binder resin is less than 400%, the foaming adaptability of the ink film is insufficient, and the suppressive power of the ink film against the foaming of the low-Mp resin film that forms a heat insulating layer by a heat treatment, is increased. Accordingly, foaming of the low-Mp resin film is inhibited, and it tends to be difficult to obtain sufficient heat insulating properties. On the other hand, if the elongation ratio of the binder resin exceeds 3,000%, the suppressive power of the low-Mp resin film against foaming is small, and there is a tendency that the ink film part is very susceptible to foaming.

Therefore, if use is made of a binder resin which does not have an elongation ratio in the specific range such as described above, it is difficult to obtain a surface with less surface unevenness after a foaming treatment of the low-Mp resin film based on heating. Even for the printed layer, it is difficult to obtain those properties desired of a container, such as external appearance, heat resistance and abrasion resistance, and there is a tendency that satisfactory printing property cannot be secured. According to a preferred embodiment of the present invention, a binder resin having an elongation ratio in the range of 450% to 850% is used. By using a binder resin having an elongation ratio in the range mentioned above, the printing property can be further enhanced. Control of the elongation ratio of the binder resin is achieved by various combinations of synthetic resins, control of the molecular weight upon the synthesis of resin, alteration of the Tg of the monomer, and regulation of the crosslinking density.

The term "elongation ratio" as described herein means the value obtained by making a measurement on a sample having a size of a thickness of 0.3 mm and a width of 15 mm, using a small-size tensile tester manufactured by Intesco Co., Ltd. at a tensile speed of 100 mm/min and at room temperature (25° C.).

In regard to the binder resin used in the present invention, any resin that is conventionally well known as a binder resin for printing inks can be used, as long as the resin has an elongation ratio in the range of 400% to 3,000%. Examples of such a resin include a urethane resin, a vinyl-based copolymer, a polyamide resin, nitrocellulose, a chlorinated polyolefin resin, an alkyd resin, a rosin resin and nitrocellulose.

Among the resins described above, it is preferable to use, but not limited to, at least a urethane resin from the viewpoint of the foaming adaptability of the ink upon foaming and the sensory odor, and under consideration of the various resistances of the ink such as light fastness, heat resistance, abrasion resistance and anti-blocking property, and of the adhesiveness to the low-Mp resin film serving as a base material. When use is made of a urethane resin, or of a resin mixture containing a urethane resin as a main component as the binder resin, the foul odor generated from the printed sections provided on the body unit of a paper container such as a paper cup can be almost completely eliminated, even after a storage in an environment exposed to heat or light over a long time. Furthermore, satisfactory results may be obtained for various properties of the ink film, including the abrasion resistance, anti-blocking property and adhesiveness to the low-Mp resin film serving as a base material.

The term "urethane resin" used in the present invention means a broad range of urethane resins, including the general urethane resins conventionally used in the pertinent technical field, and modified urethane resins including urethane-urea resins and the like. Furthermore, the urethane resin used according to the present invention is not particularly limited according to the production method, and various urethane resins obtained by applying a method that is publicly known or widely known in connection with urethane resins, are acceptable. According to the present invention, a preferred embodiment of the urethane resin may include, but not limited to, a urethane resin obtained by reacting a polyol compound and an organic diisocyanate. Another embodiment may include a modified urethane resin obtained by modifying a prepolymer of a urethane resin with an amine compound or an amide compound. These urethane resins will be respectively explained below.

Specific examples of the polyol compound that can be used in the production of the urethane resin include the various known polyols shown below.

(1) Polyether polyols, such as polymers or copolymers of ethylene oxide, propylene oxide and tetrahydrofuran;

(2) Polyester polyols obtained by dehydration condensation of saturated and unsaturated low molecular weight glycols such as ethylene glycol, 1,2-propanediol, 1,3-propanediol, 1,3-butanediol, 1,4-butanediol, neopentyl glycol, pentadiol, methylpentadiol, hexadiol, octanediol, nonanediol, methyl-nonanediol, diethylene glycol, triethylene glycol and dipropylene glycol, with alkyl glycidyl ethers such as n-butyl glycidyl ether and 2-ethylhexyl glycidyl ether, monocarboxylic acid glycidyl esters such as versatic acid glycidyl ester, and dibasic acids such as adipic acid, phthalic acid, isophthalic acid, terephthalic acid, maleic acid, fumaric acid, succinic acid, oxalic acid, malonic acid, glutaric acid, pimelic acid, azelaic acid, sebacic acid and dimer acid, or anhydrides thereof;

(3) Other polycarbonate diols, polybutadiene glycols, and glycols obtained by adding bisphenol A ethylene oxide or propylene oxide; and (4) Dimer diols. These various polyols may be used singly or in combination of two or more kinds.

According to the present invention, in the case of using the polyols listed in the item (2) above, the polyol may be substituted with various other polyols up to 5% by mole of the amount of incorporation of the glycol. That is, for example, the polyol may be substituted with a polyol such as glycerin, trimethylolpropane, trimethylolethane, 1,2,6-hexanetriol, 1,2,4-butanetriol or pentaerythritol.

The number average molecular weight of the polyol is appropriately determined by taking into consideration of the properties of the urethane resin obtained as a reaction product, such as solubility, dryability and anti-blocking property. The number average molecular weight is not particularly limited, but usually, the number average molecular weight is suitably in the range of 500 to 10,000, and more preferably in the range of 500 to 6,000. If the number average molecular weight is less than 500, the printing suitability tends to decrease, concomitantly with a decrease in solubility. Furthermore, if the number average molecular weight is greater than 10,000, the dryability and anti-blocking property tend to decrease.

On the other hand, the organic diisocyanate compound that can be used in the production of the urethane resin according to the present invention may be one of various known aromatic, aliphatic or alicyclic diisocyanates. Specific examples include 1,5-naphthylene diisocyanate, 4,4'-diphenylmethane diisocyanate, 4,4'-diphenyldimethylmethane diisocyanate, 4,4'-dibenzyl isocyanate, dialkyldiphenylmethane diisocyanate, tetraalkyldiphenylmethane diisocyanate, 1,3-phenylene diisocyanate, 1,4-phenylene diisocyanate, tolylene diisocyanate, butane-1,4-diisocyanate, hexamethylene diisocyanate, isopropylene diisocyanate, methylene diisocyanate, 2,2,4-trimethylhexamethylene diisocyanate, cyclohexane-1,4-diisocyanate, xylene diisocyanate, isophorone diisocyanate, lysine diisocyanate, dicyclohexylmethane-4,4'-diisocyanate, 1,3-bis(isocyanatomethyl)cyclohexane, methylcylcohexane diisocyanate, norbornane diisocyanate, m-tetramethylxylene diisocyanate, and a dimer diisocyanate obtained by substituting the carboxyl group of a dimer acid with an isocayanate group.

The method for producing the urethane resin may be a conventionally publicly known or widely known method, and is not particularly limited. For example, in the case of allowing a polyol compound to react with an organic diisocyanate, there is no limitation on the conditions, except that the organic diisocyanate is used in excess with respect to the polyol compound. In a preferred embodiment of the production of urethane resin according to the present invention, it is desirable to adjust the molar equivalent ratio of isocyanate group/ hydroxyl group in the range of 1.2/1 to 3/1. If the molar equivalent ratio of isocyanate group/hydroxyl group is 1.2/1 or lower, the urethane resin thus obtained tends to become brittle. When a brittle urethane resin is used as a binder resin for printing inks, blocking is prone to occur. On the other hand, if the molar equivalent ratio of isocyanate group/hydroxyl group is 3/1 or higher, the viscosity increases during the production of a urethane resin, and gelation is prone occur during the reaction. The polyurethanation reaction in the production of a urethane resin is usually carried out at a reaction temperature in the range of 80° C. to 200° C., and preferably in the range of 90° C. to 150° C.

The polyurethanation reaction may be carried out in a solvent, or may be carried out in a solvent-free atmosphere. In the case of using a solvent, a solvent can be appropriately selected from the solvents that will be listed below, from the viewpoint of controlling the reaction temperature, viscosity and side reactions. Furthermore, in the case of carrying out the polyurethanation reaction in a solvent-free atmosphere, it is desirable to carry out the reaction after decreasing the viscosity by increasing the temperature to the extent that sufficient stirring can be achieved, in order to obtain a uniform urethane resin. The reaction time for the polyurethanation reaction is desirably set at 10 minutes to 5 hours. The point of completion of the reaction can be determined by methods such as viscosity measurement, confirmation of the NCO peak by IR analysis, and measurement of the NCO % by titration.

An example of the modified urethane resin according to the present invention may be a polyurethane-urea resin. A suitable polyurethane-urea resin that can be used in the present invention is a resin obtained by reacting the polyol compound and organic diisocyanate listed above to synthesize a prepolymer of a urethane resin having isocyanate groups at the ends, and then introducing a urea bond into the prepolymer of the urethane resin by using an amine compound or an amide compound as a chain extending agent and a reaction terminating agent. In the present invention, various properties of the ink film can be further increased by using the polyurethane-urea resin mentioned above in particular, among the urethane resins.

Examples of the chain extending agent that can be used to introduce a urea bond include various known amines. Specific examples include ethylenediamine, propylenediamine, hexamethylenediamine, triethylenetetramine, diethylenetriamine, isophorone diamine, and dicyclohexylmethane-4,4'-diamine. Other examples include: diamines having a hydroxyl group in the molecule, such as 2-hydroxyethyl ethylenediamine, 2-hydroxyethyl propylenediamine, di-2-hydroxyethyl ethylenediamine, di-2-hydroxyethyl propylenediamine, 2-hydroxypropyl ethylenediamine, and di-2-hydroxypropyl ethylenediamine; and dimer diamines obtained by substituting the carboxyl group of a dimer acid with an amino group.

Examples of the compound that can be used as the reaction terminating agent according to the present invention include aliphatic amine compounds or fatty acid amide compounds, each having a long chain alkyl group having from 8 to 22 carbon atoms. Examples of the aliphatic amine compounds may include octylamine, laurylamine, coconut amine, myristylamine, stearylamine, oleylamine, palmitylamine and dibutylamine, and these can be used singly or as mixtures of two or more kinds. Examples of the fatty acid amide compounds include octanoic acid amide, decanoic acid amide, lauric acid amide, myristic acid amide, palmitic acid amide, stearic acid amide, behenic acid amide, oleic acid amide, erucic acid amide, linolic acid amide, and linoleic acid amide, and these can be used singly or as mixtures of two or more kinds.

When the aliphatic amine or fatty acid amide compound having a long chain alkyl group having from 8 to 22 carbon atoms is introduced into the ends of the prepolymer of the urethane resin, the anti-blocking property of the ink film can be enhanced. It is not intended to be bound by theory, but it is believed that since the long chain alkyl group exhibits surface-active properties, the long chain alkyl groups are oriented at the coating film surface in the course of film forming, thereby improving the anti-blocking property of the urethane resin. Although such a fatty acid amine or fatty acid amide is introduced into the urethane resin, inconveniences such as a decrease in the gloss of the coating film surface do not occur.

The production method for introducing a urea bond into a prepolymer of a urethane resin is not particularly limited. For example, when the number of free isocyanate groups present at both ends of the prepolymer is defined as 1, it is preferable to adjust the total number of the amino groups present in the chain extending agent and reaction terminating agent used, in the range of 0.5 to 1.3. If the total number of the amino groups is less than 0.5, there is a tendency that dryability, anti-blocking property and the effects of enhancing the coating film strength are not sufficiently obtained. On the other hand, if the total number of the amino groups is greater than 1.3, the chain extending agent and the reaction terminating agent may remain unreacted, and a foul odor tends to remain behind in the printed layer.

The solvent used in the production of the urethane resin and the production of the polyurethane-urea resin may be a widely known compound that can be usually used as a solvent for printing inks. Examples include alcohol-based solvents such as methanol, ethanol, isopropanol, n-propanol and n-butanol; ketone-based solvents such as acetone, methyl ethyl ketone, and methyl isobutyl ketone; ester-based solvents such as ethyl acetate, propyl acetate and butyl acetate; and non-aromatic hydrocarbon-based solvents such as methylcyclohexane and ethylcyclohexane. These solvents can be used singly or as mixtures of two or more kinds. In addition, when a ketone-based solvent such as mentioned above is used during the production, ketimine is produced between the ketone and the amine used as the chain extending agent, and this product inhibits smooth proceeding of the reaction. Therefore, in order to suppress the generation of ketimine and to allow smooth proceeding of the reaction, it is desirable to use a small amount of water together.

The number average molecular weight of the urethane resin used as the binder resin according to the present invention is preferably in the range of 5,000 to 100,000. When an ink composition for printing is prepared using a urethane resin having a number average molecular weight of less than 5,000, there is a tendency that the properties of the ink composition, such as the dryability, anti-blocking property, film strength and oil resistance, are prone to decrease. On the other hand, when a urethane resin having a number average molecular weight of greater than 100,000 is used, there is a tendency that the viscosity of the printing ink is increased, and the gloss of the printing ink film decreases.

According to an embodiment of the ink composition of the present invention, it is preferable to use another binder resin such as a vinyl-based copolymer and nitrocellulose in appropriate combination, in addition to the urethane resin explained above. When a urethane resin is used in combination with another resin, the external appearance of foaming tends to be enhanced, in addition to the improvement of various properties. It is not intended to be bound by theory, but it is believed that when components having elongation ratios that are different from that of the urethane resin are added, those components act as a kind of binding agent when the urethane component is expanded by a heat treatment and forms a foam layer.

The nitrocellulose that can be used in the present invention may be a well known nitrocellulose compound conventionally used in printing inks. On the other hand, as the vinyl-based copolymer, use can be made of a copolymer obtained by copolymerizing one of vinyl chloride monomers, fatty acid vinyl monomers and various vinyl monomers, with another polymerizable monomer having an unsaturated carbon-carbon double bond and if necessary, having a functional group, in one molecule. From the viewpoint of enhancing the external appearance of foaming, it is preferable to use a urethane resin and a vinyl-based copolymer in combination. Hereinafter, specific examples of the vinyl-based copolymer that can be used in the present invention will be described.

Examples of the fatty acid vinyl monomer that can be used as a monomer for producing the vinyl-based copolymer include vinyl acetate, vinyl propionate, vinyl monochlorate, vinyl versatate, vinyl laurate, vinyl stearate, and vinyl benzoate.

Examples of the functional group in the other polymerizable monomer having a carbon-carbon unsaturated double bond and as necessary, having a functional group, in one molecule, include a hydroxyl group, a carboxyl group, an isocyano group and an epoxy group.

For example, examples of the monomer having a hydroxyl group include vinyl alcohol, 2-hydroxyethyl(meth)acrylate, 1-hydroxypropyl(meth)acrylate, 2-hydroxypropyl(meth)acrylate, 4-hydroxybutyl(meth)acrylate, polyethylene glycol mono(meth)acrylate, polypropylene glycol mono(meth)acrylate, hydroxystyrene, and N-methylolacrylamide.

Examples of the monomer having a carboxyl group include (meth)acrylic acid, itaconic acid, isovaleric acid, maleic acid, fumaric acid, and derivatives thereof. Examples of the derivatives include (meth)acrylonitrile, (meth)acrylic acid salts, alkyl(meth)acrylates such as methyl(meth)acrylate, butyl(meth)acrylate, ethylhexyl(meth)acrylate and stearyl(meth)acrylate, and benzyl(meth)acrylate.

Examples of the monomer having an isocyano group include (meth)acryloyloxyethyl isocyanate and (meth)acryloyloxypropyl isocyanate, as well as the reaction products obtained by reacting a hydroxyalkyl(meth)acrylate such as 2-hydroxyethyl(meth)acrylate and 4-hydroxybutyl(meth)acrylate, with a polyisocyanate such as toluene diisocyanate and isophorone diisocyanate.

Examples of the monomer having an epoxy group include glycidyl methacrylate, glycidyl cinnamate, glycidyl allyl ether, glycidyl vinyl ether, vinylcyclohexanemonoepoxide, and 1,3-butadiene monoepoxide.

In the present invention, one or two or more kinds of the monomer compounds mentioned above can be appropriately selected and used in accordance with the various performances requested of the ink composition. A preferred embodiment of the binder resin according to the present invention may be a combination of a vinyl chloride/vinyl acetate copolymer and a urethane resin.

The production of the vinyl-based copolymer used in the present invention is not particularly limited, and can be carried out by applying a conventionally known method. For example, a so-called suspension polymerization method can be applied, in which water, a dispersant and a polymerization initiator are introduced into a polymerization vessel, the mixture is degassed, subsequently, a portion of a vinyl chloride monomer and a fatty acid vinyl monomer are pressure fed into the polymerization vessel to initiate the reaction, and then a polymerization reaction is carried out while the remaining portion of the vinyl chloride monomer is pressure-fed to the polymerization vessel during the reaction. The vinyl copolymer thus obtained is also available as commercially marketed product. For example, according to the present invention, "NISSIN VINYL" (trade name) manufactured by Nissin Chemical Industry Co., Ltd., can be used as the vinyl chloride/vinyl acetate copolymer.

The polymerization initiator used in the production of the vinyl-based copolymer may be a peroxide or azo compound that is representative in the pertinent technical field. For example, benzoyl peroxide, azoisobutylvaleronitrile, azobisisobutyronitrile, di-t-butyl peroxide, t-butylperbenzoate, t-butyl peroctoate, cumene hydroxyperoxide, or the like can be used. The polymerization temperature is 50 to 140° C., and preferably 70 to 140° C. A preferred number average molecular weight of the obtained vinyl-based copolymer is 5,000 to 100,000.

At the time of the polymerization as described above, for example, a non-aromatic solvent is used. Examples of the solvent that can be used in the present invention include ketones such as acetone, methyl ethyl ketone, methyl isobutyl ketone, and cyclohexanone; ethers such as tetrahydrofuran, dioxane, ethylene glycol dimethyl ether, and diethylene glycol dimethyl ether; and esters such as ethyl acetate and butyl acetate. The solvent may also be used as mixtures of two or more kinds.

According to the present invention, in the case of using a urethane resin and a vinyl-based copolymer in combination as a binder resin, the content ratio of the urethane resin and the vinyl-based copolymer is preferably in the range of 50:50 to 99:1. Furthermore, from the viewpoint of the adhesiveness to the base paper, anti-blocking property, dispersibility of ink, abrasion resistance, and ink adaptability upon foaming, the content ratio is more preferably in the range of 55:45 to 95:5.

Furthermore, the total content of the binder resin relative to the total weight of the ink composition is preferably 30% by weight or less, and more preferably in the range of 5 to 25% by weight. When the amount of use of the binder resin is adjusted within the range mentioned above, it is easy to obtain an appropriate ink viscosity, and the operation efficiency at the time of ink production and printing can be increased.

The colorant used in the ink composition of the present invention may be one of various inorganic pigments and organic pigments generally used in printing inks or coating materials. Examples of the inorganic pigments include white pigments such as titanium oxide; chromatic pigments such as Bengara, Prussian Blue, Ultramarine Blue, carbon black and graphite; and extender pigments such as calcium carbonate, kaolin, clay, barium sulfate, aluminum hydroxide and talc. Furthermore, examples of the organic pigments include chromatic pigments such as soluble azo pigments, insoluble azo pigments, azo chelate pigments, condensed azo pigments, copper phthalocyanine pigments, and condensed polycyclic pigments. The content of these pigments can be appropriately selected while taking into consideration of the desired color tone of the ink or the like, but in general, the content is preferably in the range of 0.5 to 50% by weight relative to the total weight of the ink composition.

In the case of preparing the white ink composition according to the present invention, the amount of incorporation of the white pigment is preferably set in the range of 20 to 50% by weight relative to the total weight of the ink composition. From the viewpoint of concealability, pigment concentration and light fastness, it is preferable to use titanium dioxide as the white pigment. On the other hand, in the case of preparing the chromatic ink composition according to the present invention, chromatic organic pigments and chromatic inorganic pigments such as Bengara, Prussian Blue, Ultramarine Blue, carbon black and graphite can be appropriately selected and used. From the viewpoint of color developability and light fastness, an organic pigment is preferred. The amount of incorporation of the chromatic pigment is preferably in the range of 10 to 30% by weight relative to the total weight of the ink composition.

In general, when a color ink is constituted using a chromatic pigment as a colorant and a printed layer is formed, the color ink tends to have an increased suppressive power against the foaming of the low-Mp resin film and insufficient foaming adaptability, as compared with the white ink. Accordingly, there is a strong tendency that in a printed surface after foaming, the print pattern section formed with a color ink collapses as compared with the print pattern section formed with a white ink. However, according to the present invention, in the case of preparing an ink composition as a color ink, the foaming adaptability of the ink film can be enhanced by adding silicon dioxide as an additional component. Furthermore, by adding silicon dioxide, the occurrence of ink splits (cracks) in the ink film can be suppressed. Therefore, even when a color ink is used, the uniformity and isotropy of the printed surface are maintained, and the smoothness and the sense of brightness can be retained.

The silicon dioxide that can be used in the present invention may be, for example, a compound known as "synthetic silica" produced by an already known method. Representative production methods for synthetic silica include a wet method of producing an ultrafine powder of hydrated silicic acid by allowing a sodium silicate based on high purity silica sand as a raw material, to react with an acid; and a dry method of subjecting silicon tetrachloride to combustion hydrolysis in the gas phase.

The silicon dioxide used in the present invention is not particularly limited according to the synthesis method. For example, any of a silicon wax, a treated silica produced by surface modifying an organosilicon compound with a treating agent, and untreated silicon dioxide (untreated silica) is acceptable. The particle size of the silicon dioxide used in the present invention is preferably in the range of 2 to 20 μl. When a silicon dioxide having a particle size of 2 μm or less is used, there is a tendency that the viscosity of the obtained ink composition increases, and the condition of the ink is made poor. On the other hand, when a silicon dioxide having a particle size of 20 μm or greater is used, the foaming adaptability of the ink film against the foaming of a low-melting point resin film at the time of heat treatment during the production of a container tends to be deteriorated. According to the present invention, more preferably, a silicon dioxide having a particle size in the range of 3 to 10 μm is used.

The particle size of silicon dioxide is generally measured by a Coulter counter method utilizing a change in electrical resistance, a laser method utilizing light scattering, or the like. According to the present invention, the particle size means an average particle size that is obtained by the measurement utilizing a laser method.

In the case of using silicon dioxide in the present invention, the content of silicon dioxide is preferably adjusted in the range of 0.2 to 5% by weight relative to the total mass of the ink composition. If the content of silicon dioxide is 0.2% by weight or less, there is a tendency that a sufficient effect of improving the foaming adaptability of the ink film is not obtained. If the content is 5% by weight or more, there is a tendency that the viscosity of the ink increases, and the condition of ink is made poor. Furthermore, the abrasion resistance tends to decrease. The content is more preferably 0.5 to 3.5% by weight from the viewpoint of the condition of ink and the foaming adaptability.

Examples of the solvent used in the ink composition of the present invention mainly include alcohol-based organic solvents such as methanol, ethanol, n-propanol, isopropanol and butanol; ketone-based organic solvents such as acetone, methyl ethyl ketone and methyl isobutyl ketone; ester-based organic solvents such as methyl acetate, ethyl acetate, propyl acetate and butyl acetate; aliphatic hydrocarbon-based organic solvents such as n-hexane, n-heptane and n-octane; and alicyclic hydrocarbon-based organic solvents such as cyclohexane, methylcyclohexane, ethylcyclohexane, cycloheptane, and cyclooctane. When the solubility of the binder resin and dryability are considered, it is preferable to use the various solvents mentioned above in a mixture. These organic solvents are incorporated at a proportion of 30% by weight or more in conventional ink compositions. As such, in the present invention, a non-aromatic solvent can be used to constitute an ink composition, and therefore, deterioration of the environment at the time of printing can be prevented.

In the ink composition of the present invention, various hard resins, crosslinking agents and waxes can be added for the purpose of enhancing the adhesiveness or various resistances. Examples of the hard resin include a dimer acid-based resin, a maleic acid-based resin, a petroleum resin, a terpene resin, a ketone resin, a dammar resin, a copal resin, and chlorinated polypropylene. When a hard resin is added into the ink composition, an effect of enhancing the adhesiveness of the ink film to the base material can be expected. Therefore, it is effective in an instance where a printed layer is formed on a plastic film which has not be surface treated.

The ink composition of the present invention can contain a crosslinking agent or a wax component for the purpose of enhancing heat resistance, oil resistance or abrasion resistance.

Examples of the crosslinking agent include alkyl titanate-based and isocyanate-based crosslinking agents. More specific examples include, as alkyl titanate-based crosslinking agents, tetraisopropoxytitanium, tetra-n-butoxytitanium, tetrakis(2-ethylhexyloxy)titanium, tetrastearyloxytitanium, tri-isopropoxytitanium monostearate, tri-n-butoxytitanium monostearate, diisopropoxytitanium distearate, and di-n-butoxytitanium distearate; and as isocyanate-based crosslinking agents, aliphatic polyisocyanate compounds, alicyclic polyisocyanate compounds, aromatic aliphatic polyisocyanate compounds, aromatic polyisocyanates, and various Biuret compounds and isocyanarate compounds. Among these, from the viewpoint of heat resistance, alkoxytitanium stearate-based compounds are more suitable, and from the viewpoint of increasing the adhesiveness to films, isocyanate-based crosslinking agents and the like are also effective.

On the other hand, as the wax, various known waxes such as polyolefin waxes and paraffin waxes can be used.

Furthermore, the ink composition of the present invention may be incorporated with various additives for ink such as a pigment dispersant, a leveling agent, a surfactant and a plasticizer, as necessary.

In the case of constituting a white ink as an embodiment of the ink composition of the present invention, a preferred composition of the white ink includes 20 to 50% of an inorganic pigment, 3 to 15% of a urethane resin (solids content), 0.1 to 4% of a vinyl chloride acetate resin (solids content), 0.1 to 5% of an auxiliary agent containing wax (solids content), 5 to 40%, of an ester-based solvent, 5 to 30% of an alcohol-based solvent, and 1 to 15% of a ketone-based solvent. A more preferred composition of the white ink includes 30 to 40% of an inorganic pigment, 5 to 10% of a urethane resin (solids content), 0.5 to 2% of a vinyl chloride acetate resin, 0.5 to 3% of an auxiliary agent containing wax (solids content), 10 to 30% of an ester-based solvent, 10 to 20), of an alcohol-based solvent, and 3 to 15% of a ketone-based solvent.

On the other hand, in the case of constituting a color ink as an embodiment of the ink composition of the present invention, a preferred composition of the color ink includes 10 to 30% of an organic pigment, 3 to 20% of a urethane resin (solids content), 1 to 15% of a vinyl chloride acetate resin (solids content), 0.1 to 5% of an auxiliary agent containing wax (solids content), 10 to 30% of an ester-based solvent, 20 to 50% of an alcohol-based solvent, and 5 to 10% of a ketone-based solvent. Furthermore, it is preferable to add silicon dioxide to the above composition of color ink at a proportion of 0.2 to 5% relative to the total weight of the color ink. A more preferred composition of the color ink includes 10 to 30% of an organic pigment, 5 to 15% of a urethane resin (solids content), 1 to 20% of a vinyl chloride acetate resin (solids content), 0.5 to 2% of an auxiliary agent containing wax (solids content), 15 to 25% of an ester-based solvent, 30 to 40% of an alcohol-based solvent, and 2 to 10% of a ketone-based solvent. It is preferable to add silicon dioxide to the above composition of color ink at a proportion of 1 to 3.5% relative to the total weight of the color ink composition.

The ink composition of the present invention can be prepared by mixing the various components mentioned above by applying a widely known technique. More specifically, a method may be mentioned in which first, a pigment, a binder resin, an organic solvent, and according to necessity, a pigment dispersant, a surfactant and the like are mixed under stirring, subsequently the mixture is kneaded using various kneading machines such as, for example, a bead mill, a ball mill, a sand mill, an attriter, a roll mill, and a pearl mill, and other remaining materials are further added and mixed.

(Paper Container Material)

The heat insulating foamed paper container material according to the present invention is a material for producing heat insulating foamed paper containers, and is characterized in that the material is constituted by using the ink composition according to the present invention explained above. More specifically, the heat insulating foamed paper container material (hereinafter, simply referred to as "paper container material") of the present invention includes, as shown in FIG. 1, a base paper 10; a first thermoplastic synthetic resin film 20 that covers one surface of the base paper 10; a second thermoplastic synthetic resin film 30 that covers the other surface of the base paper, has a lower melting point than the first thermoplastic synthetic resin film, and is foamed by a heat treatment to form a heat insulating layer; and a printed layer 40 provided on at least a part of the surface of the film 30, and the material is characterized in that the printed layer 40 contains at least one print pattern 42 that is formed from the ink composition according to the present invention.

The base paper used for producing the paper container material of the present invention is not particularly limited. However, from the viewpoint of the container weight, a base paper having a basis weight in the range of 80 g/m$^2$ to 400 g/m$^2$ is preferred. It is also preferable that this base paper have a water content in the range of about 5 to 10% by weight, from the viewpoint of foamability at the time of the production of containers.

The first thermoplastic synthetic resin film (high-Mp resin film) and the second thermoplastic synthetic resin film (low-Mp resin film) that are laminated on the base paper, may be films formed from a resin material which is conventionally well known as a container material. For example, the film can be appropriately selected for use from films formed from stretched and unstretched polyolefins such as polyethylene and polypropylene, and thermoplastic synthetic resins such as polyester, nylon, cellophane and vinylon. However, when a container is produced from the container material of the present invention described above, the container material is used such that the low-Mp resin film constitutes the outer wall surface of the container body. Therefore, the melting point of the low-Mp resin film must be lower than the melting point of the high-Mp resin film that forms the inner wall surface of the container body. For example, as previously explained with regard to the related art techniques, a high melting point polyethylene film having a melting point of about 130° C. to 135° C. can be used as the first thermoplastic synthetic resin film. Furthermore, a low melting point polyethylene film having a melting point of about 105° C. to 110° C. can be used as the low-Mp resin film.

However, the respective thermoplastic synthetic resin films that can be used in the present invention are not limited to combinations of polyethylene film having different melting points, and films formed from other resin materials can be appropriately selected and used. According to the present invention, it is desirable that the high-Mp resin film do not undergo melting or softening when the low-Mp resin film is foamed by a heat treatment. That is, the indications of high melting point and low melting point are described from a relative point of view, and are not intended to be limited by the specific melting points of the respective resin film. However, since those paper containers holding food products such as cup noodles are usually subjected to pouring of boiling water, the melting point of the resin film used as the low-Mp resin film must be 100° C. or higher.

When the inner wall surface of the body and the outer wall surface of the body of the container are respectively constituted of a polyethylene film, one surface of the base paper (inner wall surface of the container) should be laminated with a medium-density or high-density polyethylene film, while the other surface (outer wall surface of the container) should be laminated with a low-density polyethylene film. The thickness of the respective films to be laminated on the base paper is not particularly limited. However, it is preferable that the thickness of the low-Mp resin film that constitutes the outer wall surface of the container body, be appropriately set up so as to be a thickness sufficient for the film layer after foaming to function as a heat insulating layer when the film is foamed. For example, when the outer wall surface of the container body is constituted of a low-density polyethylene film, the thickness of the film to be laminated on the base paper may be 25 to 80 μm. On the other hand, when the inner wall surface of the container body is constituted of a medium-density or high-density polyethylene film, the thickness of the film to be laminated on the base paper is not particularly limited. However, it is preferable to set up the thickness of the film appropriately so as to secure the resistance to the penetration of the content when the material is fabricated into a heat insulating foamed paper container. Since the thickness of the film to be laminated on the base paper varies with the rein material of the film used, it is preferable that a person having ordinary skill in the art appropriately set up the thickness of the film, while considering the properties of the resin material.

The printed layer in the paper container material constituted as explained above is formed by using the ink composition according to the present invention, and performing surface printing gravure printing on the low-Mp resin film that constitutes the outer wall surface of the container. The constitution of the printed layer is not particularly limited, and any well known technique may be applied. FIG. 1 is a schematic cross-sectional view showing an embodiment of the paper container material. In the embodiment shown in FIG. 1, the printed layer 40 contains, on the low-Mp resin film 30, a print pattern 42 such as a decorative pattern, formed from the ink composition of the present invention. The print pattern 42 may be a pattern of either a white ink or a color ink. The print pattern may also have a constitution in which, for example, a color ink is overprinted on a print pattern formed from a white ink.

Figure 2:
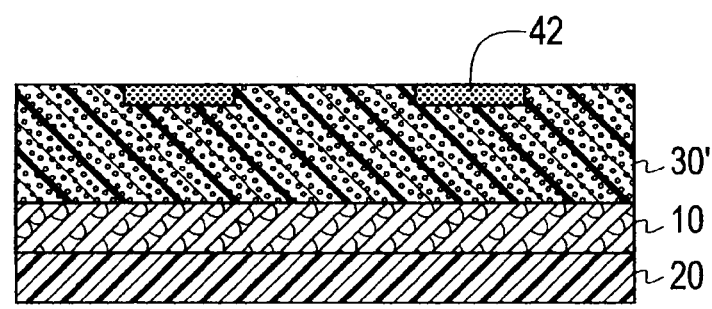
FIG. 2 is a schematic cross-sectional view showing the condition of the paper container material shown in FIG. 1 after a heat treatment.

Conventionally, when a printed layer such as shown in FIG. 1 is formed on the low-Mp resin film using a color ink, there is a tendency that the printed layer inhibits the foaming of the low-Mp resin film, so that the thickness of the film after foaming is not uniform and the printed areas are indented, and thereby a significant difference in level with the non-printed areas occurs. However, according to the present invention, the occurrence of depression on the printed surface after the foaming of the low-Mp resin film can be effectively suppressed. FIG. 2 is a schematic cross-sectional view showing the condition of the paper container material of the present invention shown in FIG. 1 after being foamed by a heat treatment. As shown in FIG. 2, according to the present invention, the printed layer has excellent foaming adaptability, and therefore, the thickness of the low-Mp resin film foamed by a heat treatment (heat insulating layer 30') becomes uniform. Thereby, the surface of the printed layer 40 becomes uniform with the foamed surface of the film in the non-printed areas, and thus the occurrence of surface unevenness is suppressed.

Figure 3:
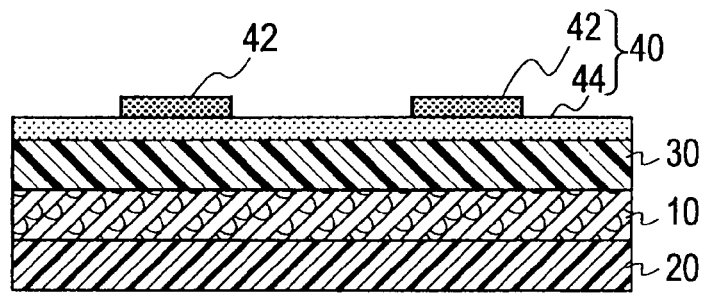
FIG. 3 is a schematic cross-sectional view showing an embodiment of the paper container material according to the present invention.

FIG. 3 is a schematic cross-sectional view showing another embodiment of the paper container material according to the present invention. The printed layer 40 of the paper container material shown in FIG. 3 is constituted from an undercoat layer 44 formed on the film 30, and a print pattern 42 formed on the undercoat layer 44. The formation of such a printed layer can be carried out by, for example, first printing a white ink over the entire surface of the film 30, and then printing a pattern of a color ink. In the paper container material having such a constitution, when the printed layer is formed using a conventional printing ink, the ink film tends to suppress the foaming of the low-Mp resin film at the time of heat treatment, and also, a difference occurs in the foaming thickness of the low-Mp resin film in the white ink section and the color ink section, so that surface unevenness is prone to be formed. However, according to the present invention, when the printed layer is formed from a particular ink composition, even if an undercoat layer is provided over the entire surface of the low-Mp resin film, the ink film has excellent foaming adaptability, and therefore, the ink film does not inhibit the foaming of the low-Mp resin film upon the production of containers. Furthermore, even when the printed layer is constructed by overprinting as shown in FIG. 3, the thickness of the heat insulating layer formed by a heat treatment becomes uniform, and a printed surface having less surface unevenness is easily obtained.

Figure 4:
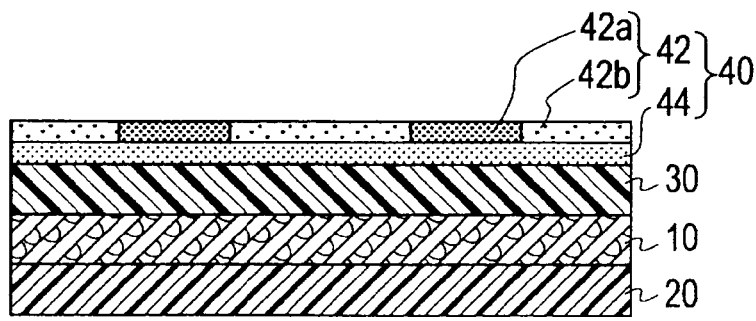
FIG. 4 is a schematic cross-sectional view showing an embodiment of the paper container material according to the present invention.

FIG. 4 is a schematic cross-sectional view showing another embodiment of the paper container material according to the present invention. The printed layer of the paper container material shown in FIG. 4 is constituted from an undercoat layer 44 formed on the film 30, and a pattern 42 consisting of a first print section 42a and a second print section 42b formed on the undercoat layer 44. The formation of such a printed layer is carried out such that, initially, a first layer is printed as an undercoat layer 44 using a white ink over the entire surface of the film. Subsequently, a second layer is pattern-wise printed using the white ink to form a first print section 42a, and then printing is performed using color inks of red color or the like, in the non-printed areas other than the first print section 42a of the second layer formed by the white ink, to form a second print section 42b. As such, there can be formed a printed layer having a two-layer constitution (white/white, white/red, and the like) in which the print pattern 42 consisting of the first and second print sections 42a and 42b, is formed on the undercoat layer 44. The order of printing with the white ink and color ink that form the first and second print patterns of the second layer, is not particularly limited.

The paper container material of the present invention having a constitution such as shown in FIG. 4 is preferable in the aspect that as previously explained in connection with FIG. 3, a smooth printed surface is easily obtained, and that since the thickness of the printed layer formed on the low-Mp resin film is constant, obtaining a smooth printed surface is more easily achieved even after the foaming of the low-Mp resin film by a heat treatment.

Printing of the ink composition for forming a printed layer in the present invention is not particularly limited, and any well known technique may be applied. For example, in the case of performing printing using a white ink or the like over the entire surface of the film so as to form an undercoat layer, a coater such as a bar coater, a roll coater or a reverse roll coater may be used.

(Heat Insulating Foamed Paper Container)

The heat insulating foamed paper container according to the present invention is constituted from a container body member and a bottom plate member, and is characterized in that the container body member is formed from the paper container material according to the present invention. More specifically, the heat insulating foamed paper container of the present invention has, as shown in FIG. 5, a container body 50 formed from the paper container material of the present invention, and is obtained by joining the container body with a bottom plate 60 such that the high-Mp resin film in the paper container material forms the inner wall surface 50a of the container and the printed layer on the low-Mp resin film forms the outer wall surface 50b of the container, thereby forming a container, and foaming the second thermoplastic synthetic resin film by heat treating the container.

The processing of forming the heat insulating foamed paper container of the present invention can be carried out by applying a well known technique. For example, firstly, a container body member obtained by punching the heat insulating foamed paper container material of the preset invention along a frame into a predetermined shape, and a bottom plate member obtained by punching a bottom plate material in the same manner into a predetermined shape, are assembled into a container shape using a conventional container manufacturing apparatus, and thus a container is formed. The formation of a container by assembling using a container manufacturing apparatus is carried out such that the high-Mp resin film of the container body member forms the inner wall surface, while the low-Mp resin film forms the outer wall surface, and the laminated surface of the bottom plate member comes to the inner side. After a container is formed by assembling by a container manufacturing apparatus as the above, when the container is subjected to a heat treatment, the low-Mp resin film is foamed and thereby forms a heat insulating layer, and thus a heat insulating foamed paper container is obtained.

The heating temperature or heat time in the heat treatment for forming a heat insulating layer, vary depending on the properties of the base paper or thermoplastic synthetic resin films used. A person having ordinary skill in the art can appropriately select and determine the combination conditions for the heating temperature and heating time that are optimal for the films used. In general, the heat treatment carried out in the container forming process involves, but not limited to, a heating temperature of about 100° C. to about 200° C., and a heating time of about 20 seconds to about 10 minutes. In the case of using a low-density polyethylene (thickness 70 μm), the heating temperature is preferably 100° C. to 130° C., and the heating time is preferably about 5 minutes to 6 minutes. As a heating means, any means such as hot air, electrical heating and electron beams can be used. When heating is performed using hot air, electrical heating or the like within a tunnel equipped with a conveying means using a conveyor, it is possible to produce large quantities of heat insulating foamed paper cups at low cost.

Figure 5:
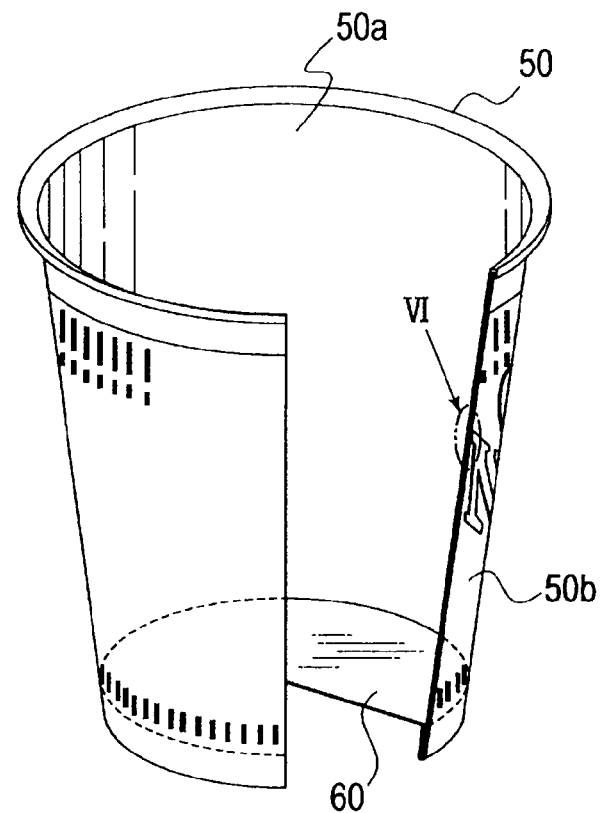
FIG. 5 is a perspective view showing an embodiment of a heat insulating foamed paper container according to the present invention.
Figure 6:
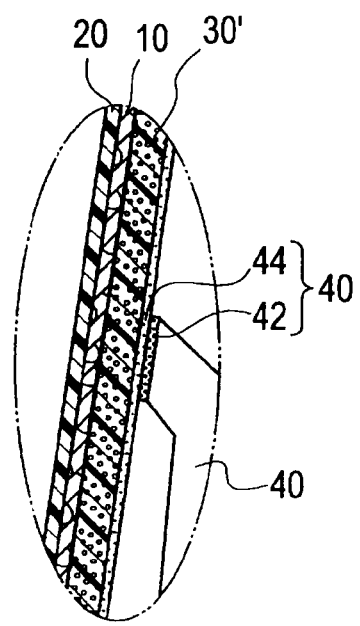
FIG. 6 is a schematic cross-sectional view showing a magnified view of the section VI of the heat insulating foamed paper container shown in FIG. 5.

FIG. 5 is a perspective view showing the structure of a heat insulating foamed paper container obtained by carrying out a heat treatment after the assembling and forming of the container. In the drawing, reference numeral 50 refers to the container body, and reference numeral 60 refers to the bottom plate. FIG. 6 is a schematic cross-sectional view showing a magnified view of the reference numeral VI section of the container body of the heat insulating foamed paper container shown in FIG. 5. The container body is composed of, in the order from the outer wall surface 50b of the container, a printed layer 40, a heat insulating layer 30' formed from a low-Mp resin film, a base paper 10, and a high-Mp resin film 20 forming the inner wall surface of the container. In addition, the layer constitution of the container body member of the container shown in FIG. 6 is equivalent to the structure obtained by foaming the paper container material shown in FIG. 3.

As it can be seen from FIG. 6, the printed layer 40 that forms the container surface shown in FIG. 5 is composed of an undercoat layer 44 that is provided over the entire surface of the heat insulating layer 30' and formed from a white ink, and a print pattern 42 that is formed thereon and formed from a color ink. As such, according to the present invention, since the printed layer 40 forming the outer wall surface of the container body is constituted from an ink composition having excellent foaming adaptability, the printed layer (Reference Numeral 40 in FIG. 3) on the low-Mp resin film (Reference Numeral 30 in FIG. 3) does not inhibit the foaming of the film, and the low-Mp resin film forms a uniform heat insulating layer 30' by a heat treatment. Furthermore, in the foaming of the low-Mp resin film, since the printed layer has excellent foaming adaptability, the occurrence of surface unevenness on the container surface is suppressed, and the occurrence of cracks in the ink film is suppressed. As discussed above, when the ink composition according to the present invention is applied to construct a heat insulating foamed container, it is made possible to realize a smooth container surface having excellent heat insulating properties and having less surface unevenness.

EXAMPLES

Hereinafter, the present invention will be more specifically explained by way of Examples, but the present invention is not limited to those Examples. Unless particularly stated otherwise, the "parts" and "%" in the present Examples indicate "parts by weight" and "% by weight", respectively.

I. Preparation of Binder Resin Solution

Preparation Example 1

Preparation of Urethane Resin A 198.4 parts of a polytetramethylene glycol having a number average molecular weight of 2000, 10.3 parts of neopentyl glycol, 70.6 parts of isophorone diisocyanate, and 60.0 parts of ethyl acetate were fed into a four-necked flask equipped with a stirrer, a thermometer, a reflux cooler and a nitrogen gas inlet tube, and the mixture was allowed to react for 6 hours at 90° C. under a nitrogen gas stream. Thus, a prepolymer was obtained. Subsequently, this prepolymer was added dropwise into a mixture of 19.9 parts of isophorone diamine, 0.8 parts of dibutylamine, 430.0 parts of ethyl acetate, and 210.0 parts of isopropyl alcohol, and the chain length was extended. Thereby, a urethane resin A having a solids content of 30% and a weight average molecular weight of 66,000 was obtained.

Preparation Example 2

Preparation of Urethane Resin B 199.0 parts of a polytetramethylene glycol having a number average molecular weight of 2000, 17.6 parts of neopentyl glycol, 64.5 parts of isophorone diisocyanate, and 60.0 parts of ethyl acetate were fed into a four-necked flask equipped with a stirrer, a thermometer, a reflux cooler and a nitrogen gas inlet tube, and the mixture was allowed to react for 6 hours at 90° C. under a nitrogen gas stream. Thus, a prepolymer was obtained. Subsequently, this prepolymer was added dropwise into a mixture of 18.2 parts of isophorone diamine, 0.7 parts of dibutylamine, 430.0 parts of ethyl acetate, and 210.0 parts of isopropyl alcohol, and the chain length was extended. Thereby, a urethane resin B having a solids content of 30% and a weight average molecular weight of 74,000 was obtained.

Preparation Example 3

Preparation of Urethane Resin C 210.9 parts of a polytetramethylene glycol having a number average molecular weight of 2000, 7.9 parts of neopentyl glycol, 65.3 parts of isophorone diisocyanate, and 60.0 parts of ethyl acetate were fed into a four-necked flask equipped with a stirrer, a thermometer, a reflux cooler and a nitrogen gas inlet tube, and the mixture was allowed to react for 6 hours at 90° C. under a nitrogen gas stream. Thus, a prepolymer was obtained. Subsequently, this prepolymer was added dropwise into a mixture of 15.3 parts of isophorone diamine, 0.6 parts of dibutylamine, 430 parts of ethyl acetate, and 210 parts of isopropyl alcohol, and the chain length was extended. Thereby, a urethane resin C having a solids content of 30% and a weight average molecular weight of 81,000 was obtained.

Preparation Example 4

Preparation of Urethane Resin D

A urethane resin manufactured by Sanyo Chemical Industries, Ltd., "SANPRENE IB465", was used as received, as a urethane resin D. The molecular weight of the urethane resin of SANPRENE IB465 is 45,000, and the solids content weight is 30% by weight.

Preparation Example 5

Preparation of Urethane Resin E 215.5 parts of a polytetramethylene glycol having a number average molecular weight of 2000, 7.2 parts of neopentyl glycol, 62.8 parts of isophorone diisocyanate, and 60.0 parts of ethyl acetate were fed into a four-necked flask equipped with a stirrer, a thermometer, a reflux cooler and a nitrogen gas inlet tube, and the mixture was allowed to react for 6 hours at 90° C. under a nitrogen gas stream. Thus, a prepolymer was obtained. Subsequently, this prepolymer was added dropwise into a mixture of 13.8 parts of isophorone diamine, 0.7 parts of dibutylamine, 430 parts of ethyl acetate, and 210 parts of isopropyl alcohol, and the chain length was extended. Thereby, a urethane resin E having a solids content of 30% and a weight average molecular weight of 87,000 was obtained.

Preparation Example 6

Preparation of Nitrocellulose 30 parts of nitrocellulose (1/8H, Asahi Chemical Co., Ltd.) was mixed and dissolved in 30 parts of ethyl acetate and 40 parts of isopropyl alcohol, and thus a nitrocellulose solution was obtained.

Preparation Example 7

Preparation of Vinyl Chloride Acetate Resin 25 parts of a vinyl chloride/vinyl acetate copolymer (SOL-BIN TA5R, manufactured by Nisshin Chemical Industry Co., Ltd.) was mixed dissolved in 75 parts of ethyl acetate, and thus a solution of a vinyl chloride/vinyl acetate copolymer (hereinafter, simply referred to as "vinyl chloride acetate resin") was obtained.

Preparation Example 8

Preparation of Acrylic Resin 40 parts of an acrylic resin (trade name: "JONCRYL 67", manufactured by BASF Corp.) was dissolved in a mixture of 40 parts of ethyl acetate and 20 parts of isopropyl alcohol, and thus an acrylic resin solution was obtained. "JONCRYL 67" has a molecular weight of 12500, an acid value of 213, and a glass transition temperature of 73° C.

II. Production of Sample for Elongation Ratio Measurement

Film test samples 1 to 14 were produced using the urethane resins, nitrocellulose and vinyl chloride acetate resin obtained in the Preparation Examples 1 to 8. The production of the film test samples was carried out according to a method of allowing the resin solution or resin solution mixture obtained in the Preparation Examples 1 to 8 to flow into a frame of a resin plate having a dimension of 10 cm in length×20 cm in width×5 mm in depth, naturally drying the resin solution or resin solution mixture over one week to produce a dry film having a thickness of about 0.3 mm, subsequently taking the film by peeling, and cutting the film into strips having a width of 15 mm. Each of the film test samples 1 to 14 was used to measure the elongation ratio according to a method for measuring the elongation ratio that will be described later. The measurement results are presented in Table 1.

As can be seen from the Table 1, the compositions of the resins used in the various samples are as follows. Sample 1 used the urethane resin A obtained in the Preparation Example 1. Sample 2 used the urethane resin B obtained in the Preparation Example 2. Sample 3 used a mixture of the urethane resin B obtained in the Preparation Example 2 and the nitrocellulose obtained in the Preparation Example 6 (mixing ratio (solids content): 75/25). Sample 4 used a mixture of the urethane resin B obtained in the Preparation Example 2 and the vinyl chloride acetate resin obtained in the Preparation Example 7 (mixing ratio (solids content): 96/4). Sample 5 used a mixture of the urethane resin B obtained in the Preparation Example 2 and the vinyl chloride acetate resin obtained in the Preparation Example 7 (mixing ratio (solids content): 90/10). Sample 6 used a mixture of the urethane resin B obtained in the Preparation Example 2 and the vinyl chloride acetate resin obtained in the Preparation Example 7 (mixing ratio (solids content): 75/25). Sample 7 used a mixture of the urethane resin B obtained in the Preparation Example 2 and the vinyl chloride acetate resin obtained in the Preparation Example 7 (mixing ratio (solids content): 55/45). Sample 8 used the urethane resin C obtained in the Preparation Example 3. Sample 9 used the urethane resin D obtained in the Preparation Example 4. Sample 10 used the urethane resin E obtained in the Preparation Example 5. Sample 11 used the vinyl chloride acetate resin obtained in the Preparation Example 7. Sample 12 used the nitrocellulose obtained in the Preparation Example 6. Sample 13 used the acrylic resin obtained in the Preparation Example 8. Sample 14 used a mixture of the urethane resin B obtained in the Preparation Example 2 and the vinyl chloride acetate resin obtained in the Preparation Example 7 (mixing ratio (solids content): 93/7). In the samples 3 to 7 and 14, nitrocellulose or a vinyl chloride acetate resin was used in combination; however, even though a resin other thane a urethane resin was used in combination as such, the total solids content of the resin was adjusted to be identical in all of the samples. A sensory test on odor was performed on each of the film test samples 1 to 14. A foul odor was perceived from the sample 13 (binder resin of the Preparation Example 8), but almost no odor was perceived in the other samples.

III. Method for Measuring Elongation Ratio

Each of the film test samples previously produced was used to measure the elongation ratio using a small-size tensile tester manufactured by Intesco Co., Ltd., under the conditions of a tensile speed of 100 mm/min and room temperature (25° C.).

TABLE 1

|  | Resin | Resin mixing ratio (solids content) | Resin elongation ratio (%) |
|---|---|---|---|
| Sample 1 | Urethane resin A |  | 450 |
| Sample 2 | Urethane resin B |  | 1600 |
| Sample 3 | Urethane resin B/ Nitrocellulose | 75/25 | 560 |
| Sample 4 | Urethane resin B/ Vinyl chloride acetate | 96/4 | 1220 |
| Sample 5 | Urethane resin B/ Vinyl chloride acetate | 90/10 | 830 |
| Sample 6 | Urethane resin B/ Vinyl chloride acetate | 75/25 | 570 |
| Sample 7 | Urethane resin B/ Vinyl chloride acetate | 55/45 | 470 |
| Sample 8 | Urethane resin C |  | 2700 |
| Sample 9 | Urethane resin D |  | 370 |
| Sample 10 | Urethane resin E |  | 3300 |
| Sample 11 | Vinyl chloride acetate |  | 100 |
| Sample 12 | Nitrocellulose |  | 50 |
| Sample 13 | Acrylic resin |  | 200 |
| Sample 14 | Urethane resin B/ Vinyl chloride acetate | 93/7 | 1020 |

Example 1

1. Preparation of White Ink 27.2 parts of the urethane resin A obtained in the Preparation Example 1, 40 parts of a white pigment (titanium oxide, TITANIX JR 800 (manufactured by Teika K.K.)), and 67.2 parts of a mixed solvent containing methylcyclohexane:isopropyl alcohol:ethyl acetate=40:40:20 (weight ratio) were blended, and the mixture was dispersed and kneaded with a sand mill. Thus, a white ink for the undercoat was prepared.

2. Preparation of Red Ink 29.2 parts of the urethane resin A obtained in the Preparation Example 1, 15 parts of a red pigment (LIONOL RED 6B FG-4300 (manufactured by Toyo Ink Manufacturing Co., Ltd.), and 47.2 parts of a mixed solvent containing methylcyclohexane:isopropyl alcohol:ethyl acetate=40:40:20 (weight ratio) were blended, and the mixture was dispersed and kneaded with a sand mill. Thus, a mill base was prepared. Subsequently, 0.9 parts of silicon dioxide (SYLOPHOBIC 200 (Fuji Silysia Chemical, Ltd., particle size 3.9 μm)) was added to the mill base, and the mixture was sufficiently stirred. Thus, a red ink for overprinting was prepared.

3. Formation of Printed Layer

A paper container material having a high melting point polyethylene film (melting point 133° C.) laminated in advance on one surface of a base paper and having a low melting point polyethylene film (melting point 106° C.) laminated on the other surface of the base paper, was provided, and on the low melting point film of the material, a printed layer of white ink/red ink overprinting having a printed layer constitution such as shown in FIG. 3 was formed with a gravure proof press, using the white ink and the red ink previously prepared.

4. Evaluation

The paper container material having a printed layer formed as described above, was subjected to a heat treatment at 120° C. for 5 minutes to foam the low melting point film, and then the paper container material was evaluated on the foaming adaptability, external appearance of foaming, abrasion resistance and heat resistance of the printed layer, according to the following evaluation methods. The results are presented in Table 2.

(Evaluation of Foaming Adaptability)

For the surface of the printed layer obtained after foaming of the low melting point film by a heat treatment, the difference in level of the white ink print section and the red ink print section was felt by touching, and the degree of depression of the red ink print section was evaluated according to the following criteria.

A: The difference in level with the white ink print section was hardly perceived.

B: The difference in level with the white ink print section was slightly perceived.

C: The difference in level with the white ink print section was perceived to some extent.

D: The difference in level with the white ink print section was perceived fairly significantly.

(Evaluation of External Appearance of Foaming)

The state of external appearance of the red ink printed surface obtained after foaming of the low melting point film by a heat treatment was visually observed, and the presence or absence of the occurrence of ink splits (cracks) was examined and evaluated according to the following criteria.

A: There are no ink splits.

B: The total area of ink splits occupies 1% or less of the printed surface.

C: The total area of ink splits occupies 1 to 30% of the printed surface.

D: The total area of ink splits occupies 30% or more of the printed surface.

(Abrasion Resistance)

The top of the red ink printed surface obtained after foaming of the low melting point film by a heat treatment was rubbed with a high-quality paper under a load of 2.5 N/cm² using a Gakushin-type abrasion resistance tester, the abrasion resistance was evaluated from the number of rubbing required to remove 20% or more of the total printed surface.

A: 100 times or more.
B: Equal to or more than 50 times and fewer than 100 times.
C: Fewer than 50 times.

(Evaluation of Heat Resistance)

An aluminum foil piece cut to the same size as the printed matter was superposed on the printed surface, and the aluminum foil was pressed for 1 second with a pressure of 2 kg/cm² using a heat seal tester. The heat resistance was evaluated from the minimum temperature at which the red ink was transferred to the aluminum foil.

A: The minimum temperature was 160° C. or higher.
B: The minimum temperature was equal to or higher than 140° C. and lower than 160° C.
C: The minimum temperature was lower than 140° C.

Examples 2 to 10 and Comparative Examples 1 and 2

White inks and red inks of Examples 2 to 10 and Comparative Examples 1 and 2 were respectively prepared in the same manner as in Example 1, except that the urethane resin was changed to the urethane resin A of Example 1, and the binder resins or binder resin mixtures indicated in Table 2 were used. However, the red ink of Example 9 was not added with silicon dioxide. In Example 10, a first layer of white ink was printed over the entire surface as an undercoat layer, subsequently a second layer of white ink was printed pattern-wise, and then printing was performed using the red ink in the non-printed areas other than the pattern-printed section of the second layer formed from the white ink. Thus, a printed layer having a constitution of a two-layered printed surface (white/white and white/red) such as illustrated in FIG. 4, was formed.

Thereafter, each of the paper container materials having an overprint printed layer produced in Examples 2 to 10 and Comparative Examples 1 and 2, was heat treated at 120° C. for 5 minutes in the same manner as in Example 1, thereby the low melting point film was foamed, and then the foaming adaptability, external appearance of foaming, abrasion resistance and heat resistance of the printed layer were evaluated. The results are presented in the following Table 2.

Example 11

Ink compositions were respectively prepared in the same manner as in Example 5, except that the 0.9 parts by weight of silicon dioxide used in Example 5 (SYLOPHOBIC 200, (Fuji Silysia Chemical, Ltd.), particle size: 3.9 μm) was changed to 4 parts by weight of a silicon dioxide having a larger particle size (SYLISIA 470, (Fuji Silysia Chemical, Ltd.), particle size: 14 μm). Subsequently, a paper container material having an overprint printed layer was produced in the same manner as in Example 1 using the ink compositions thus prepared, and the foaming adaptability, external appearance of foaming, abrasion resistance and heat resistance of the printed layer were evaluated. The results are presented in the following Table 2.

Example 12

Ink compositions were respectively prepared in the same manner as in Example 5, except that the 0.9 parts by weight of silicon dioxide used in Example 5 (SYLOPHOBIC 200, (Fuji Silysia Chemical, Ltd.), particle size: 3.9 μm) was changed to 0.1 parts by weight of a silicon dioxide having a larger particle size (SYLISIA 470, (Fuji Silysia Chemical, Ltd.), particle size: 14 μm). Subsequently, a paper container material having an overprint printed layer was produced in the same manner as in Example 1 using the ink compositions thus prepared, and the foaming adaptability, external appearance of foaming, abrasion resistance and heat resistance of the printed layer were evaluated. The results are presented in the following Table 2.

Example 13

Ink compositions were respectively prepared in the same manner as in Example 5, except that the 0.9 parts by weight of silicon dioxide used in Example 5 (SYLOPHOBIC 200, (Fuji Silysia Chemical, Ltd.), particle size: 3.9 μm) was changed to 4 parts by weight of a silicon dioxide having a smaller particle size (SYLISIA 470, (Fuji Silysia Chemical, Ltd.), particle size: 2.7 μm). Subsequently, a paper container material having an overprint printed layer was produced in the same manner as in Example 1 using the ink compositions thus prepared, and the foaming adaptability, external appearance of foaming, abrasion resistance and heat resistance of the printed layer were evaluated. The results are presented in the following Table 2.

As shown in Table 2, the respective compositions of the binder resins used in Examples 2 to 10 and Comparative Examples 1 and 2 are as follows. Example 2 used the urethane resin B obtained in the Preparation Example 2. Example 3 used a mixture of the urethane resin B obtained in the Preparation Example 2 and the nitrocellulose obtained in the Preparation Example 6 (mixing ratio (solids content): 75/25). Example 4 used a mixture of the urethane resin B obtained in the Preparation Example 2 and the vinyl chloride acetate resin obtained in the Preparation Example 7 (mixing ratio (solids content): 96/4). Example 5 used a mixture of the urethane resin B obtained in the Preparation Example 2 and the vinyl chloride acetate resin obtained in the Preparation Example 7 (mixing ratio (solids content): 90/10). Example 6 used a mixture of the urethane resin B obtained in the Preparation Example 2 and the vinyl chloride acetate resin obtained in the Preparation Example 7 (mixing ratio (solids content): 75/25). Example 7 used a mixture of the urethane resin B obtained in the Preparation Example 2 and the vinyl chloride acetate resin obtained in the Preparation Example 7 (mixing ratio (solids content): 55/45). Example 8 used the urethane resin C obtained in the Preparation Example 3. Example 9 used a mixture of the urethane resin B obtained in the Preparation Example 2 and the vinyl chloride acetate resin obtained in the Preparation Example 7 (mixing ratio (solids content): 90/10). Examples 10 to 13 respectively used a mixture of the urethane resin B obtained in the Preparation Example 2 and the vinyl chloride acetate resin obtained in the Preparation Example 7 (mixing ratio (solids content): 90/10). Example 14 used a mixture of the urethane resin B obtained in the Preparation Example 2 and the vinyl chloride acetate resin obtained in the Preparation Example 7 (mixing ratio (solids content): 93/7). Comparative Example 1 used the urethane resin D obtained in the Preparation Example 4. Comparative Example 2 used the urethane resin E obtained in the Preparation Example 5. In Examples 3 to 7 and 9 to 14, nitrocellulose or a vinyl chloride acetate resin was used in combination; however, even though a resin other than a urethane resin was used in combination as such, the total solids content of the resin was adjusted to be identical in all of the Examples.

TABLE 2

|  | Resin | Mixing ratio (solids content) | Foaming adaptability | External appearance of foaming | Abrasion resistance | Heat resistance |
|---|---|---|---|---|---|---|
| Ex. 1 | Urethane resin A |  | C | C | B | C |
| Ex. 2 | Urethane resin B |  | B | C | B | C |
| Ex. 3 | Urethane resin B/ Nitrocellulose | 75/25 | B | B | B | B |
| Ex. 4 | Urethane resin B/ Vinyl chloride acetate | 96/4 | B | B | B | B |
| Ex. 5 | Urethane resin B/ Vinyl chloride acetate | 90/10 | A | A | B | B |
| Ex. 6 | Urethane resin B/ Vinyl chloride acetate | 75/25 | A | A | B | B |
| Ex. 7 | Urethane resin B/ Vinyl chloride acetate | 55/45 | A | A | B | B |
| Ex. 8 | Urethane resin C |  | C | C | B | B |
| Ex. 9 | Urethane resin B/ Vinyl chloride acetate | 90/10 | C | B | B | B |
| Ex. 10 | Urethane resin B/ Vinyl chloride acetate | 90/10 | A | A | A | B |
| Ex. 11 | Urethane resin B/ Vinyl chloride acetate | 90/10 | B | B | C | B |
| Ex. 12 | Urethane resin B/ Vinyl chloride acetate | 90/10 | C | B | B | B |
| Ex. 13 | Urethane resinB/ Vinyl chloride acetate | 90/10 | B | B | C | B |
| Ex. 14 | Urethane resin B/ Vinyl chloride acetate | 93/7 | B | B | B | B |
| Com Ex. 1 | Urethane resin D |  | D | D | C | C |
| Com Ex. 2 | Urethane resin E |  | C | D | D | D |

(Note)
In Example 9, no silicon dioxide was added.
In Example 10, pattern printing was carried out using the white ink and the red ink as a second layer on the undercoat layer.

As it is obvious from the Table 1 and Table 2, it can be seen that when the elongation ratio of the binder resin is 400% to 3,000%, a printed surface having improved surface unevenness can be formed. It can also be seen that when a mixture of a urethane resin, particularly a urethane-urea resin, and a vinyl chloride acetate resin is used as the binder resin, the smoothness of the printed surface is improved, and an ink composition for heat insulating foamed paper container printing which is excellent in various properties is obtained. It was also found that when silicon dioxide is added to the color ink, excellent foaming adaptability is obtained, the occurrence of ink splits (cracks) at the time of foaming is absent, and surface unevenness at the printed foamed surface is hardly perceived, even for those color inks which generally have poor foaming adaptability. Containers were actually formed and processed using the heat insulating foamed paper container material according to the present invention for the container body member, and it was found that the same results were obtained.

From the discussions given above, it is clear that a wide variety of different embodiments can be constituted without departing from the spirit and the scope of the present invention, and the present invention is intended to be restricted not by the specific embodiments described above, but only by the definitions given in the claims.

The invention claimed is:

1. An ink composition, comprising:
   a colorant;
   a binder resin; and
   a solvent;
   wherein the elongation ratio of the binder resin is 400% to 3,000%;
   wherein the binder resin comprises a urethane resin and a vinyl chloride/vinyl acetate copolymer, and the mixing ratio of the urethane resin:vinyl chloride/vinyl acetate copolymer relative to the total weight of the urethane resin and the vinyl chloride/vinyl acetate copolymer is 50:50 to 99:1; and
   wherein the urethane resin comprises a urethane-urea resin that is obtained by a process comprising reacting diamines, a dibutylamine and a urethane prepolymer having terminal isocyanate groups, wherein the urethane prepolymer is obtained by a process comprising reacting a polymeric polyol component having a number average molecular weight of 500 to 10,000 and an organic diisocyanate component.

2. The ink composition according to claim 1, wherein the colorant is one or more chromatic pigments selected from the group consisting of an organic pigment, Bengara, Prussian Blue, Ultramarine Blue, carbon black and graphite.

3. The ink composition according to claim 2, further comprising silicon dioxide.

4. The ink composition according to claim 3, wherein the particle size of the silicon dioxide is 2 to 20 μm.

5. The ink composition according to claim 1, wherein the colorant is a white pigment.

6. A heat insulating foamed paper container material comprising:
   a base paper;
   a first thermoplastic synthetic resin film that covers one surface of the base paper;
   a second thermoplastic synthetic resin film that covers the other surface of the base paper, has a lower melting point than the first thermoplastic synthetic resin film, and is foamed by a heat treatment to form a heat insulating layer; and
   a printed layer provided on at least a part of the surface of the second thermoplastic synthetic resin film, wherein the printed layer comprises at least one print pattern formed from the ink composition according to claim 1.

7. The heat insulating foamed paper container material according to claim 6, wherein the printed layer has an undercoat layer covering the entire surface of the second thermoplastic synthetic resin film, and a printed pattern provided on at least a part of the surface of the undercoat layer, the undercoat layer is formed from an ink composition comprising a colorant; a binder resin; and a solvent; wherein the colorant is a white pigment; wherein the elongation ratio of the binder resin is 400% to 3,000%; wherein the binder resin comprises a urethane resin and a vinyl chloride/vinyl acetate copolymer, and the mixing ratio of the urethane resin:vinyl chloride/vinyl acetate copolymer relative to the total weight of the urethane resin and the vinyl chloride/vinyl acetate copolymer is 50:50 to 99:1; and wherein the urethane resin comprises a urethane-urea resin that is obtained by a process comprising reacting diamines, a dibutylamine and a urethane prepolymer having terminal isocyanate groups, wherein the urethane prepolymer is obtained by a process comprising reacting a polymeric polyol component having a number average molecular weight of 500 to 10,000 and an organic diisocyanate component, and at least one of the at least one print patterns is formed from an ink composition comprising a colorant; a binder resin; and a solvent; wherein the colorant is one or more chromatic pigments selected from the group consisting of an organic pigment, Bengara, Prussian Blue, Ultramarine Blue, carbon black and graphite; wherein the elongation ratio of the binder resin is 400% to 3,000%; wherein the binder resin comprises a urethane resin and a vinyl chloride/vinyl acetate copolymer, and the mixing ratio of the urethane resin:vinyl chloride/vinyl acetate copolymer relative to the total weight of the urethane resin and the vinyl chloride/vinyl acetate copolymer is 50:50 to 99:1; and wherein the urethane resin comprises a urethane-urea resin that is obtained by a process comprising reacting diamines, a dibutylamine and a urethane prepolymer having terminal isocyanate groups, wherein the urethane prepolymer is obtained by a process comprising reacting a polymeric polyol component having a number average molecular weight of 500 to 10,000 and an organic diisocyanate component.

8. The heat insulating foamed paper container material according to claim 6, wherein the printed layer has an undercoat layer covering the entire surface of the second thermoplastic synthetic resin film, and a printed pattern including a first print section provided on the surface of the undercoat layer and a second print section provided in the non-printed areas other than the first print section, the undercoat layer and the first print section are formed from an ink composition comprising a colorant; a binder resin; and a solvent; wherein the colorant is a white pigment; wherein the elongation ratio of the binder resin is 400% to 3,000%; wherein the binder resin comprises a urethane resin and a vinyl chloride/vinyl acetate copolymer, and the mixing ratio of the urethane resin: vinyl chloride/vinyl acetate copolymer relative to the total weight of the urethane resin and the vinyl chloride/vinyl acetate copolymer is 50:50 to 99:1; and wherein the urethane resin comprises a urethane-urea resin that is obtained by a process comprising reacting diamines, a dibutylamine and a urethane prepolymer having terminal isocyanate groups, wherein the urethane prepolymer is obtained by a process comprising reacting a polymeric polyol component having a number average molecular weight of 500 to 10,000 and an organic diisocyanate component, and the second print section is formed from an ink composition comprising a colorant; a binder resin; and a solvent; wherein the colorant is one or more chromatic pigments selected from the group consisting of an organic pigment, Bengara, Prussian Blue, Ultramarine Blue, carbon black and graphite; wherein the elongation ratio of the binder resin is 400% to 3,000%; wherein the binder resin comprises a urethane resin and a vinyl chloride/vinyl acetate copolymer, and the mixing ratio of the urethane resin:vinyl chloride/vinyl acetate copolymer relative to the total weight of the urethane resin and the vinyl chloride/vinyl acetate copolymer is 50:50 to 99:1; and wherein the urethane resin comprises a urethane-urea resin that is obtained by a process comprising reacting diamines, a dibutylamine and a urethane prepolymer having terminal isocyanate groups, wherein the urethane prepolymer is obtained by a process comprising reacting a polymeric polyol component having a number average molecular weight of 500 to 10,000 and an organic diisocyanate component.

9. A heat insulating foamed paper container obtained by a process comprising joining a container body member formed from the heat insulating foamed paper container material according to claim 6, with a bottom plate member such that the first thermoplastic synthetic resin film forms the inner wall surface and the second thermoplastic synthetic resin film forms the outer wall surface, thereby forming a container, and foaming the second thermoplastic synthetic resin film by heat treating the container.

* * * * *